US007758421B2

(12) United States Patent
Hornik et al.

(10) Patent No.: US 7,758,421 B2
(45) Date of Patent: Jul. 20, 2010

(54) WAGERING GAME WITH WIN-DEFERRAL FEATURE FOR PAYOFFS

(75) Inventors: Jeremy M. Hornik, Chicago, IL (US); Allon G Englman, Chicago, IL (US); Michael W. Mastropietro, Chicago, IL (US); Peter R. Anderson, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 237 days.

(21) Appl. No.: 11/628,485

(22) PCT Filed: Jun. 22, 2005

(86) PCT No.: PCT/US2005/022077

§ 371 (c)(1),
(2), (4) Date: Nov. 30, 2006

(87) PCT Pub. No.: WO2006/002241

PCT Pub. Date: Jan. 5, 2006

(65) Prior Publication Data

US 2007/0265060 A1 Nov. 15, 2007

Related U.S. Application Data

(60) Provisional application No. 60/581,981, filed on Jun. 22, 2004.

(51) Int. Cl.
*G06F 17/00* (2006.01)
*G06F 19/00* (2006.01)

(52) U.S. Cl. ............................ 463/25; 463/16; 463/17; 463/18; 463/19; 463/20; 273/138.1

(58) Field of Classification Search .................. 463/25, 463/16–20; 273/138.1
See application file for complete search history.

(56) References Cited

U.S. PATENT DOCUMENTS

| | | | | |
|---|---|---|---|---|
| 4,722,554 | A * | 2/1988 | Pettit | 283/105 |
| 4,752,068 | A | 6/1988 | Endo | 273/1 |
| 5,397,125 | A * | 3/1995 | Adams | 463/20 |
| 5,511,781 | A * | 4/1996 | Wood et al. | 463/13 |
| 5,575,474 | A | 11/1996 | Rossides | 463/26 |
| 5,609,525 | A | 3/1997 | Ohno et al. | 463/43 |
| 5,707,285 | A * | 1/1998 | Place et al. | 463/12 |
| 5,833,537 | A | 11/1998 | Barrie | 463/21 |
| 5,957,775 | A | 9/1999 | Cherry | 463/16 |
| 6,004,211 | A | 12/1999 | Brenner et al. | 463/40 |
| 6,012,045 | A | 1/2000 | Barzilai | 705/37 |
| 6,012,983 | A | 1/2000 | Walker et al. | 463/20 |

(Continued)

FOREIGN PATENT DOCUMENTS

WO WO 9929381 6/1999

(Continued)

*Primary Examiner*—Scott Jones
*Assistant Examiner*—Milap Shah
(74) *Attorney, Agent, or Firm*—Nixon Peabody LLP

(57) ABSTRACT

A gaming terminal having a wagering game. The wagering game includes a plurality of symbols that indicate a randomly selected outcome of the wagering game. In response to the randomly selected outcome being a win-deferral outcome, the wagering game provides a player with a selection of immediately obtaining a first award or obtaining a second award under a specified condition.

24 Claims, 7 Drawing Sheets

U.S. PATENT DOCUMENTS

| | | | | |
|---|---|---|---|---|
| 6,015,344 | A * | 1/2000 | Kelly et al. | 463/16 |
| 6,016,338 | A * | 1/2000 | Bansal et al. | 379/93.13 |
| 6,077,163 | A | 6/2000 | Walker et al. | 463/26 |
| 6,110,042 | A * | 8/2000 | Walker et al. | 463/25 |
| 6,113,098 | A | 9/2000 | Adams | 273/143 R |
| 6,146,270 | A * | 11/2000 | Huard et al. | 463/12 |
| 6,159,098 | A * | 12/2000 | Slomiany et al. | 463/25 |
| 6,165,071 | A | 12/2000 | Weiss | 463/24 |
| 6,193,608 | B1 * | 2/2001 | Walker et al. | 463/25 |
| 6,234,896 | B1 * | 5/2001 | Walker et al. | 463/16 |
| 6,254,481 | B1 | 7/2001 | Jaffe | 463/20 |
| 6,273,820 | B1 | 8/2001 | Haste, III | 463/40 |
| 6,302,790 | B1 | 10/2001 | Brossard | 463/20 |
| 6,311,976 | B1 | 11/2001 | Yoseloff et al. | 273/138 |
| 6,319,127 | B1 | 11/2001 | Walker et al. | 463/26 |
| 6,364,765 | B1 | 4/2002 | Walker et al. | 463/16 |
| 6,365,765 | B1 | 4/2002 | Baldwin et al. | 556/440 |
| 6,431,983 | B2 | 8/2002 | Acres | 463/25 |
| 6,506,117 | B2 | 1/2003 | DeMar | 463/20 |
| 6,506,118 | B1 | 1/2003 | Baerlocher et al. | 463/25 |
| 6,575,832 | B1 * | 6/2003 | Manfredi et al. | 463/25 |
| 6,609,970 | B1 * | 8/2003 | Luciano, Jr. | 463/16 |
| 6,663,489 | B2 | 12/2003 | Baerlocher | 463/20 |
| 6,722,981 | B2 | 4/2004 | Kaminkow | 463/20 |
| 6,722,985 | B2 | 4/2004 | Criss-Puszkiewicz et al. | 463/29 |
| 6,745,236 | B1 | 6/2004 | Hawkins et al. | 709/203 |
| 6,758,757 | B2 * | 7/2004 | Luciano et al. | 463/43 |
| 6,776,713 | B2 | 8/2004 | Gauselmann | 463/16 |
| 6,780,111 | B2 | 8/2004 | Cannon et al. | 463/25 |
| 6,796,902 | B2 * | 9/2004 | Baerlocher et al. | 463/20 |
| 6,800,027 | B2 | 10/2004 | Giobbi et al. | 463/24 |
| 6,811,486 | B1 | 11/2004 | Luciano, Jr. | 463/24 |
| RE38,733 | E * | 5/2005 | Walker et al. | 463/25 |
| 6,923,721 | B2 | 8/2005 | Luciano et al. | 463/24 |
| 7,182,690 | B2 | 2/2007 | Giobbi et al. | 463/24 |
| 2001/0024971 | A1 | 9/2001 | Brossard | 463/30 |
| 2001/0046893 | A1 | 11/2001 | Giobbi et al. | 463/24 |
| 2002/0028708 | A1 | 3/2002 | Busch et al. | 463/42 |
| 2002/0039919 | A1 | 4/2002 | Joshi et al. | 463/20 |
| 2002/0077173 | A1 | 6/2002 | Luciano, Jr. et al. | 463/23 |
| 2002/0077174 | A1 | 6/2002 | Luciano et al. | 463/25 |
| 2002/0093136 | A1 | 7/2002 | Moody | 273/139 |
| 2002/0094871 | A1 | 7/2002 | Luciano, Jr. et al. | 463/43 |
| 2002/0107065 | A1 | 8/2002 | Rowe | 463/20 |
| 2002/0128057 | A1 * | 9/2002 | Walker et al. | 463/20 |
| 2002/0151349 | A1 | 10/2002 | Joshi | 463/20 |
| 2002/0177479 | A1 * | 11/2002 | Walker et al. | 463/25 |
| 2002/0177483 | A1 * | 11/2002 | Cannon | 463/42 |
| 2002/0196342 | A1 | 12/2002 | Walker et al. | 348/157 |
| 2003/0013515 | A1 | 1/2003 | Rowe et al. | 463/25 |
| 2003/0013516 | A1 * | 1/2003 | Walker et al. | 463/25 |
| 2003/0013531 | A1 | 1/2003 | Rowe et al. | 463/42 |
| 2003/0036422 | A1 | 2/2003 | Baerlocher et al. | 463/20 |
| 2003/0036427 | A1 | 2/2003 | Brandstetter et al. | 463/29 |
| 2003/0060273 | A1 * | 3/2003 | Kaminkow et al. | 463/25 |
| 2003/0064794 | A1 | 4/2003 | Mead et al. | 463/25 |
| 2003/0078101 | A1 | 4/2003 | Schneider et al. | 463/42 |
| 2003/0100362 | A1 | 5/2003 | Horniak et al. | 463/25 |
| 2003/0106769 | A1 | 6/2003 | Weiss | 463/21 |
| 2003/0114219 | A1 | 6/2003 | McClintic | 463/25 |
| 2003/0119579 | A1 * | 6/2003 | Walker et al. | 463/20 |
| 2003/0157979 | A1 | 8/2003 | Cannon et al. | 463/16 |
| 2003/0195024 | A1 | 10/2003 | Slattery | 463/9 |
| 2003/0199320 | A1 * | 10/2003 | Nguyen et al. | 463/42 |
| 2003/0211881 | A1 | 11/2003 | Walker et al. | 463/20 |
| 2004/0053680 | A1 | 3/2004 | Schultz | 463/20 |
| 2004/0087368 | A1 * | 5/2004 | Gauselmann | 463/42 |
| 2004/0142742 | A1 | 7/2004 | Schneider et al. | 463/25 |
| 2004/0162134 | A1 * | 8/2004 | Walker et al. | 463/20 |
| 2005/0003886 | A1 | 1/2005 | Englman et al. | 463/25 |
| 2005/0159207 | A1 | 7/2005 | Thomas | 463/20 |
| 2006/0019740 | A1 * | 1/2006 | Schugar | 463/25 |
| 2006/0068893 | A1 | 3/2006 | Jaffe et al. | 463/20 |
| 2006/0079316 | A1 | 4/2006 | Flemming et al. | 463/25 |
| 2006/0079317 | A1 | 4/2006 | Flemming et al. | 463/20 |
| 2006/0084495 | A1 | 4/2006 | Jaffe et al. | 463/20 |
| 2006/0089194 | A1 | 4/2006 | Joshi et al. | 463/25 |

FOREIGN PATENT DOCUMENTS

| | | |
|---|---|---|
| WO | WO 2005082480 | 9/2005 |
| WO | WO 2006002241 | 1/2006 |
| WO | WO 2006004831 | 1/2006 |
| WO | WO 2006004832 | 1/2006 |
| WO | WO 2006005073 | 1/2006 |
| WO | WO 2006017036 | 2/2006 |
| WO | WO 2006017067 | 2/2006 |
| WO | WO 2006017068 | 2/2006 |
| WO | WO 2006020811 | 2/2006 |
| WO | WO 2006026250 | 3/2006 |
| WO | WO 2006044252 | 4/2006 |

* cited by examiner

WAGERING GAME WITH WIN-DEFERRAL FEATURE FOR PAYOFFS

RELATED APPLICATIONS

This application is a U.S. National Phase of International Application No. PCT/US 2005/022077 filed Jun. 22, 2005, which in turn claims priority from U.S. Provisional Application No. 60/581,981 filed Jun. 22, 2004. Both of these applications are hereby incorporated by reference in their entirety.

FIELD OF THE INVENTION

The present invention relates generally to gaming terminals and, more particularly, to a gaming terminal having win-deferral award system.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves collecting coin-in data from participating gaming device(s) (e.g., slot machines), contributing a percentage of that coin-in data to a jackpot amount, and awarding that jackpot amount to a player upon the occurrence of a certain jackpot-won event. The percentage of the coin-in is determined prior to any result being achieved and is independent of any result. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

In current basic games, bonus games, and progressive games, the player is provided with little incentive to return the game at a later time. Once the player chooses to stop playing the game in that round, the player is immediately awarded any credits that are remaining and also loses assets that have been accumulated, but not yet awarded. For example, in some games, the bonus game consists of the player collecting assets and when a certain number or combination of assets is accumulated, the player wins an award. However, should the player choose to leave the game prior to winning the award, the player loses all of the assets accumulated. This can cause player frustration and does not provide the player with any incentive to return to the game.

Such a system also encourages "vulturing," in which the "vulturing" player waits for a person who is close to winning an award to leave the gaming machine prior to the winning of the award. The "vulturing" player then begins to play the machine, and may quickly win the award without investing much time into the game. This is also frustrating for other players.

Thus, there is a need to allow a player to accumulate assets on gaming terminals and to have those assets restored to them should the player return to the game at a later time. This way, should a player choose to leave a game, anything the player has accumulated during the game goes with them and is restored at a later time when the player returns to the game. This alleviates the player frustration at losing assets that they have accumulated and also provides the player an incentive to return to the game at a later date.

SUMMARY OF THE INVENTION

According to one embodiment of the present invention, the needs mentioned above are met by a gaming terminal having a wagering game. In this embodiment, the wagering game includes a plurality of symbols that indicate a randomly selected outcome of the wagering game. In response to the randomly selected outcome being a win-deferral outcome, the wagering game provides a player with a selection of immediately obtaining a first award or obtaining a second award under a specified condition.

According to another embodiment of the invention, a method of playing a wagering game is disclosed. The method includes conducting the basic game at a gaming terminal. A win-deferral award is achieved at the gaming terminal, and first and second awards are displayed. The gaming terminal determines a specified condition that a player is required to meet to obtain the second award, and the player, via inputs, then selects one of the first award or the second award. In response to the selection of the first award, the gaming terminal awards the player the first award; and in response to the selection of the second award, the gaming terminal awards the player the second award if the specified condition is met.

In another embodiment, a gaming system includes at least one display and at least one gaming terminal for playing a wagering game, the wagering game having a win-deferred outcome. The gaming system also includes a controller coupled to the at least one gaming terminal and the at least one display. The controller is operative to: cause the display to display a first award option and a second award option in response to the win-deferred outcome being achieved; present a specified condition to be met in conjunction with awarding the second award; and determine whether the specified condition has been met prior to awarding the second award.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
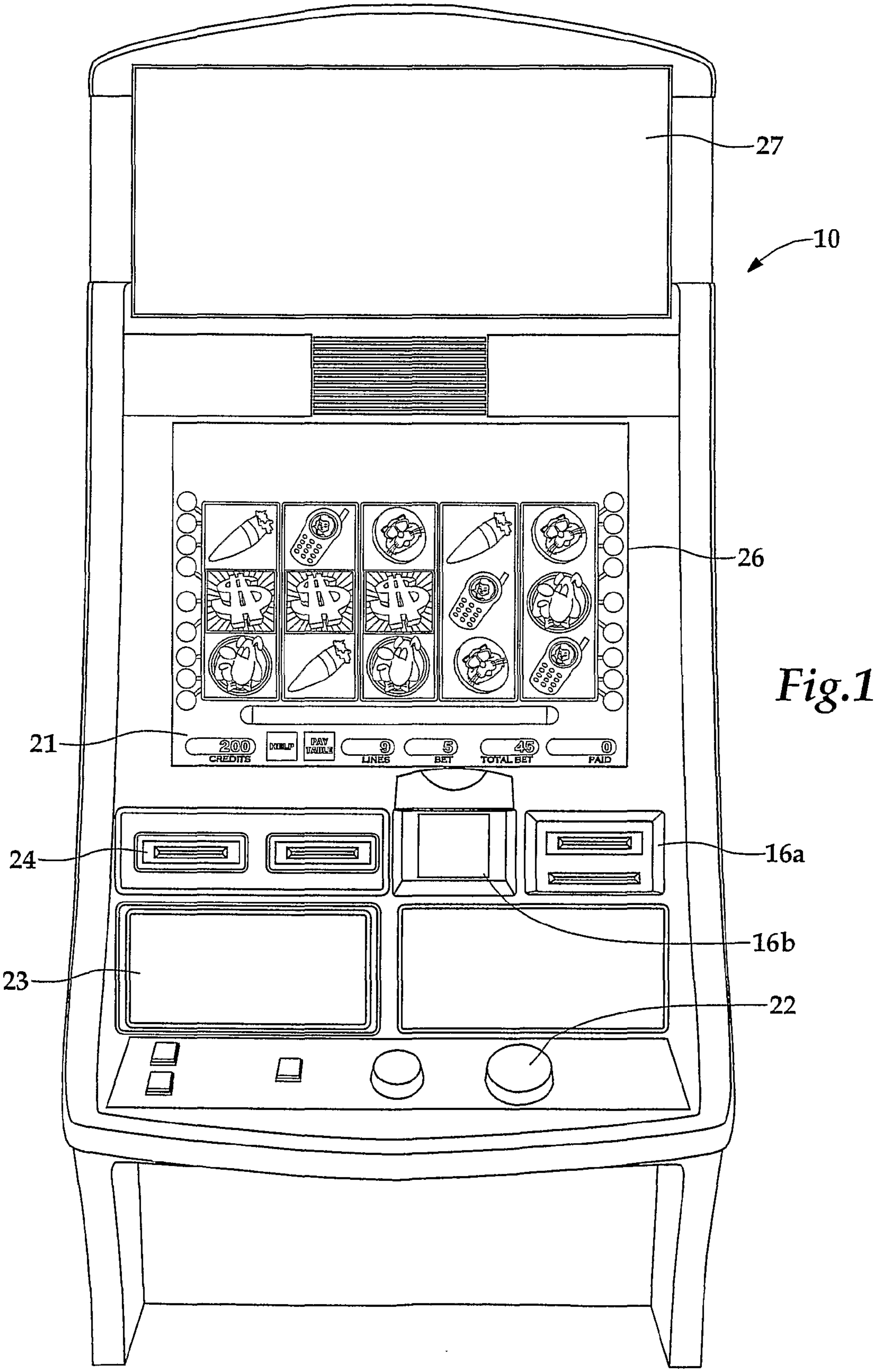
FIG. 1 is a perspective view of a video gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play video slots or a video casino game, such as blackjack, slots, keno, poker, etc.

As shown, the gaming terminal 10 includes input devices, such as a wager acceptor 16 (shown as a card wager acceptor 16*a* and a cash wager accepter 16*b*), a touch screen 21, a push-button panel 22, and an information reader 24. For outputs, the gaming terminal 10 includes a payout mechanism 23, a main display 26 for displaying information about the basic wagering game, and a secondary display 27 that may display an electronic version of a pay table, and/or also possibly game-related information or other entertainment features. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The cash wager acceptor 16*a* may include a coin slot acceptor or a note acceptor to input value to the gaming terminal 10. The card wager acceptor 16*b* may include a card-reading device for reading a card that has a recorded monetary value with which it is associated. The card wager acceptor 16*b* may also receive a card that authorizes access to a central account, which can transfer money to the gaming terminal 10.

Also included is the payout mechanism 23, which performs the reverse functions of the wager acceptor. For example, the payout mechanism 23 may include a coin dispenser or a note dispenser to output value from gaming terminal 10. Also, the payout mechanism 23 may also be adapted to receive a card that authorizes the gaming terminal to transfer credits from the gaming terminal 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire monitor (or a portion thereof) to allow players to make game-related selections. Alternatively, the gaming terminal 10 may have a number of mechanical reels to display the game outcome, as well.

In some embodiments, the information reader 24 is a card reader that allows for identification of a player by reading a card with information indicating his or her true identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The information reader 24 may also include a keypad (not shown) for entering a personal identification number (PIN). The gaming terminal 10 may require that the player enter their PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved.

Figure 2:
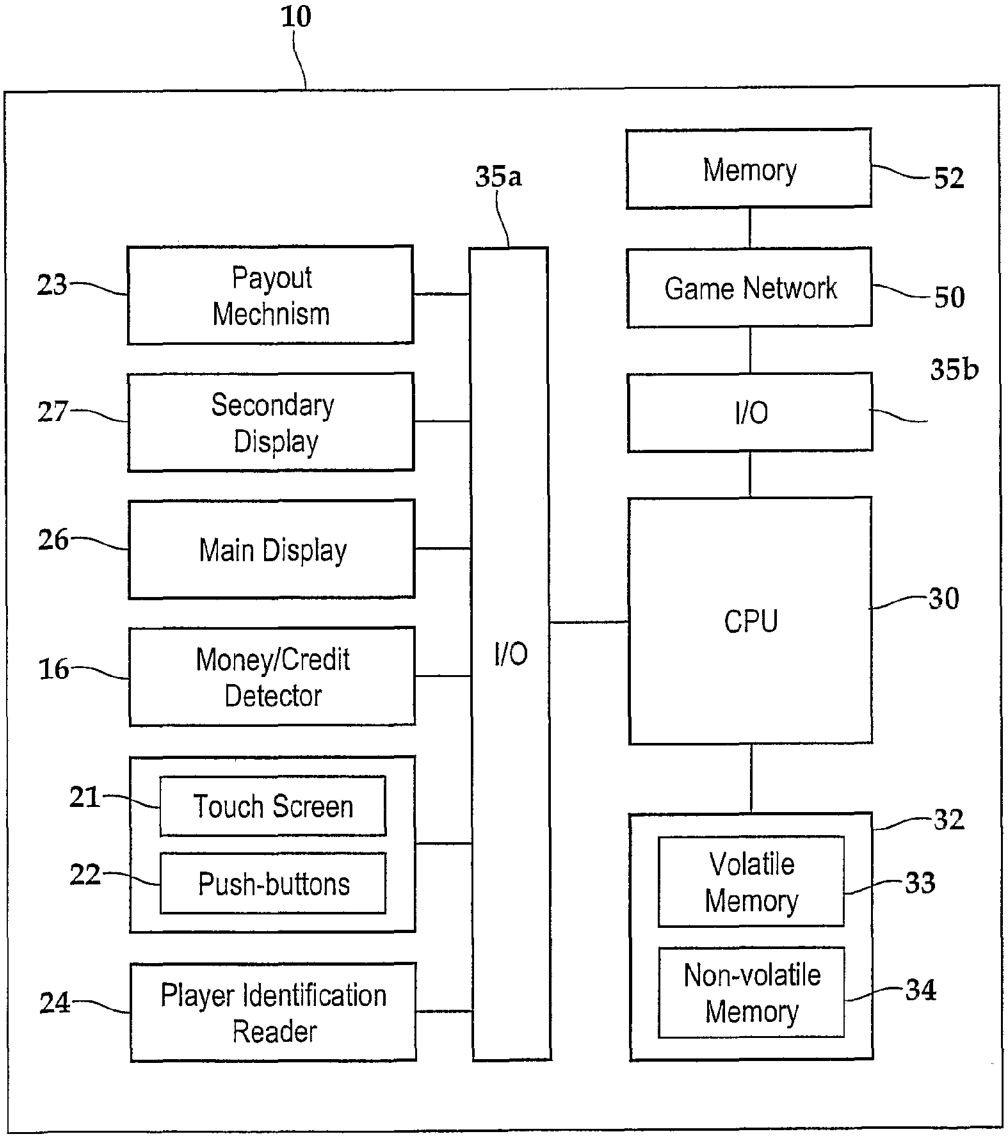
FIG. 2 is a block diagram of the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

In some embodiments, the CPU 30 may not be inside the gaming terminal 10. Instead, the CPU 30 may be part of a game network 50 (FIG. 2) and may be used to control numerous gaming terminals 10. In these embodiments, the CPU 30 will run the basic games for each of the gaming terminals 10, and may also be used to link the gaming terminals 10 together. The game network 50 can include progressive jackpots that are contributed to by all or some of the gaming terminals 10 in the network (e.g., terminal-level jackpots that only each terminal 10 contributes to, bank-level jackpots that are contributed to by all of the terminals 10 in a particular bank, and wide-area jackpots that are contributed to by a larger number of terminals 10, such as multiple banks). Alternatively, the game network 50 can allow the player to retrieve assets obtained while playing one terminal 10 at a different gaming terminal that is also part of the game network. Assets may be any number of things, including, but not limited to, monetary or non-monetary awards, features that a player builds up in a bonus or progressive game to win awards, etc.

In some embodiments, the CPU 30 is also used with the information reader 24 to restore saved assets. For example, in one embodiment, the information reader 24 is adapted to receive and distribute tickets. The tickets each include a unique identifier. The unique identifier links the ticket to a file contained within the local memory 32 or a system memory 52 located in the game network 50. The file includes the assets that are being stored from a previous game. Monetary awards include game credits or money, while the non-monetary awards can be free plays (e.g., free spins), multipliers, or access to bonus and/or progressive games.

When a player inserts a ticket into the information reader 24, the CPU 30 obtains the unique identifier and causes the appropriate memory 32, 52 to be searched, and the file containing the unique identifier matching the identifier on the ticket is retrieved. Any assets or other information contained in this file are then transmitted to the gaming terminal 10, and the player regains any assets that were saved during a previous game. This allows the player to keep assets even after a particular gaming session ends, which increases player commitment to a game and decreases vulturing (and possibly even ends it).

In other embodiments, the information reader 24 may include a card reader, and the unique identifier provided at the gaming terminal 10 may be stored on a personal identification card, such as one described above. Or, the gaming terminal 10 includes a radio frequency identification device (RFID) transceiver or receiver so that an RFID transponder held by the player can be used to provide the unique identifier of the player at the gaming terminal 10 without the need to insert a card into the gaming terminal 10. RFID components can be those available from Pacific Northwest National Laboratory (under the United States Department of Energy) of Richland, Wash.

In other embodiments, the information reader 24 may include a biometric reader, such as a finger, hand, or retina scanner, and the unique identifier may be the scanned biometric information. Additional information regarding biometric scanning, such as fingerprint scanning or hand geometry scanning, is available from International Biometric Group LLC of New York, N.Y. Other biometric identification techniques can be used as well for providing a unique identifier of the player. For example, a microphone can be used in a biometric identification device on the gaming terminal so that the player can be recognized using a voice recognition system.

In other embodiments, the player may simply have to enter in a unique identification code and password into the gaming terminal 10. In these embodiments, the player would not have to insert a physical object (such as a card or ticket) into the gaming terminal, but would instead use the information reader as an input device, such as a keyboard.

In summary, there are many techniques in which to provide a unique identifier for the player so that the assets accumulated by the player during one wagering session can be stored in either the system or local memory 52, 32, thereby allowing the player to subsequently access those assets at the same gaming terminal 10 or a different gaming terminal within the network 50. As described below with reference to FIGS. 3 to 7, various assets related to the wagering game features and formats can be stored after one gaming session and used in a subsequent gaming session(s) to enhance the gaming experience for the player.

Figure 3:
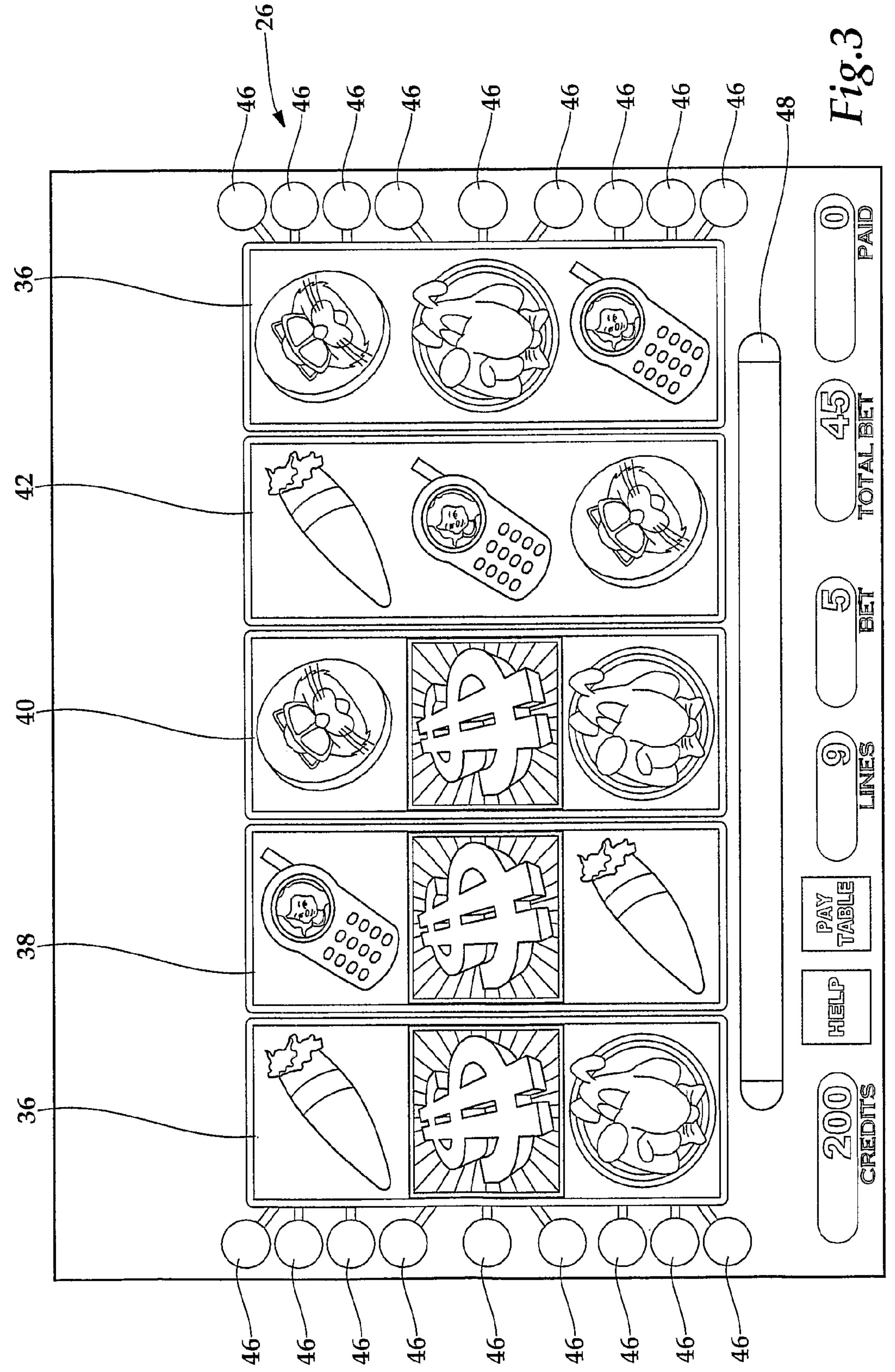
FIG. 3 illustrates a display of a basic game on the gaming terminal of FIG. 1.

Turning now to FIG. 3, the main display 26 of one embodiment of the present invention is shown in more detail. In this embodiment, the basic wagering game is a slot machine game, with symbols on five different reels 36, 38, 40, 42, 44. The reels 36-44 may be either traditional mechanical reels or they may be computer-generated images of reels, with each reel composed of a plurality of symbols. The payline indicators 46 indicate a randomly selected outcome for each payline, which is the combination of symbols on the reels 36-44. Thereafter, an outcome indicator 48 indicates whether the outcome has resulted in a winning outcome or a non-winning outcome. In the present example, various combinations of the symbols can result in winning outcomes, which include monetary and non-monetary prizes. The non-monetary prizes can include free spins, multipliers, and entry into an advanced game such as bonus game or a progressive game. While multiple paylines are shown, a gaming terminal 10 with a single payline will also work with the present invention.

In this particular embodiment, a particular group of symbols generates a win-deferral award 52. In this embodiment, a combination of three dollar signs along any payline being played generates a win-deferral award 52. In other embodiments, all award-winning combinations generate the win-deferral award 52 or a single particular symbol may generate the win-deferral award 52.

Figure 4:
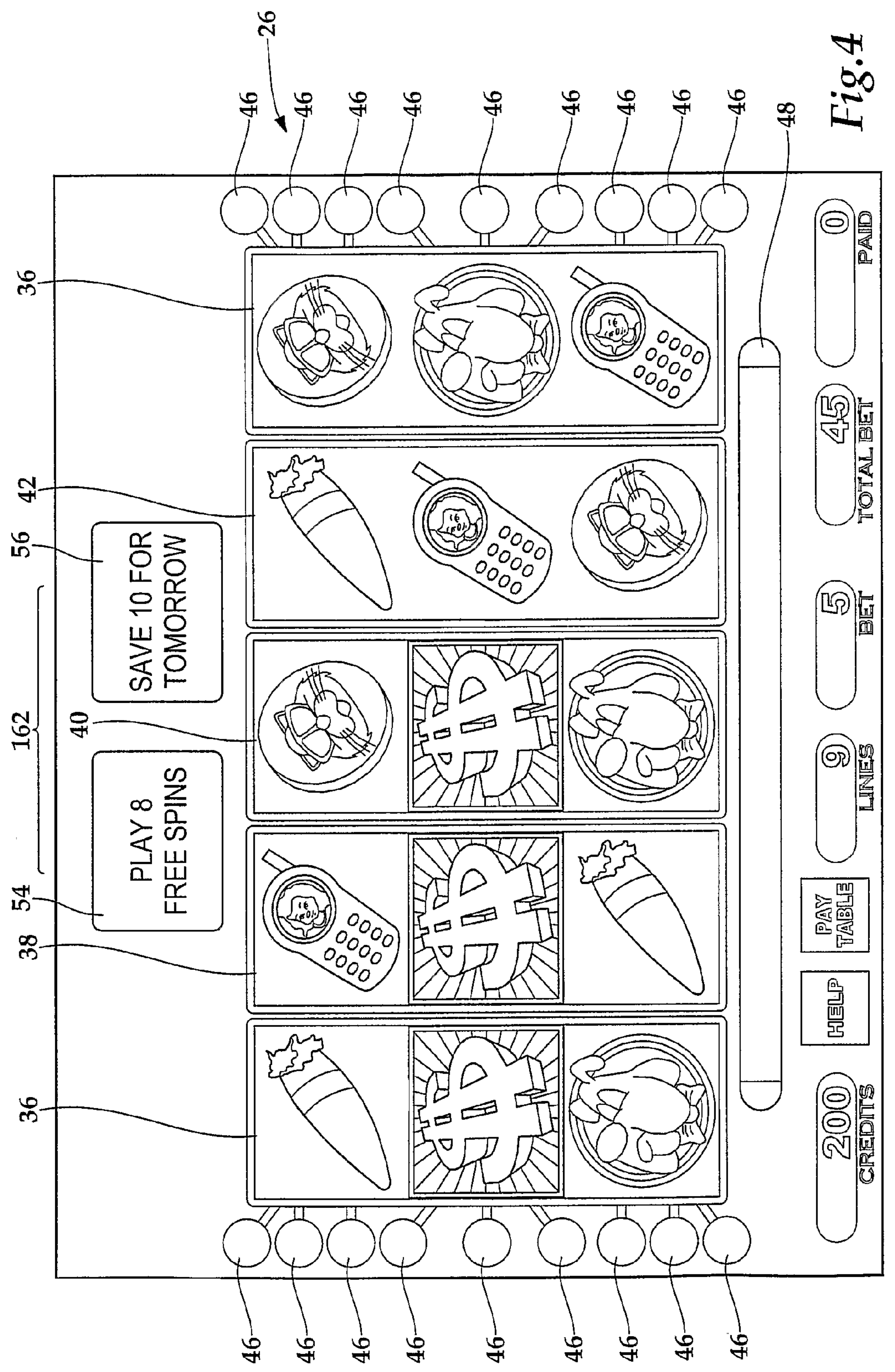
FIG. 4 illustrates an initial winning game screen on the gaming terminal of FIG. 1.

Once the player achieves the win-deferral award 52, a screen such as the one illustrated in FIG. 4 is displayed on either the main display 26 or the secondary display 27. For purposes of this example, the main display 26 will be used. The win-deferral award 52 may include monetary awards, non-monetary awards, or combinations thereof. The monetary awards include credits, while the non-monetary awards can be free spins, multipliers, or access to bonus and/or progressive games. In this embodiment, the win-deferral award 52 is in the form of free spins that the player can win. As shown, the player is given the option of choosing between at least two player-selectable elements. In this embodiment, the two choices include claiming a first award 54 (eight free spins) now, or claiming a second award 56 (ten free spins) under a specified condition 58 (tomorrow). In this embodiment, only two choices are shown. In other embodiments, there may be a plurality of second awards 56 shown, with each one having a different specified condition 58 attached to it. As the second awards 56 increase in value, the specified condition 58 may be more difficult or restrictive. In this embodiment, the specified condition 58 requires the player to play the game any time during the next day. The specified condition 58 may require a specific date, time frame (e.g., month, year, week, or span of hours), and even game and location (e.g., terminal, bank of terminals, casino, or city) that must be played in order to collect the second award 56 (deferred prize).

In some embodiments, the specified condition is determined by the CPU 30. The CPU 30 may utilize self-learning techniques to evaluate coin input versus time. This information can then be used to determine the best times to try to induce players back to the gaming terminal 10 and choose among those times for the specified condition 58. For example, the CPU 30 may determine that Mondays between 2 and 5 p.m. are the slowest times for that gaming terminal 10, and, thus, the specified condition 58 may be chosen as a particular Monday, Mondays in general, a particular Monday from 2 and 5 p.m., or any combination. In other embodiments, the casino (or other outside source) may dictate the specified condition, and the CPU 30 may only be used to present the specified condition 58 to the player.

Also, once the player has chosen between the first award 54 and the second award 56, the main display 26 may provide a screen asking the player to confirm their decision. In some embodiments, the main display 26 may also provide a screen confirming the choice made. In other embodiments, the gaming terminal 10 may not provide any or request any confirmations and instead proceed directly to playing another game.

Figure 5:
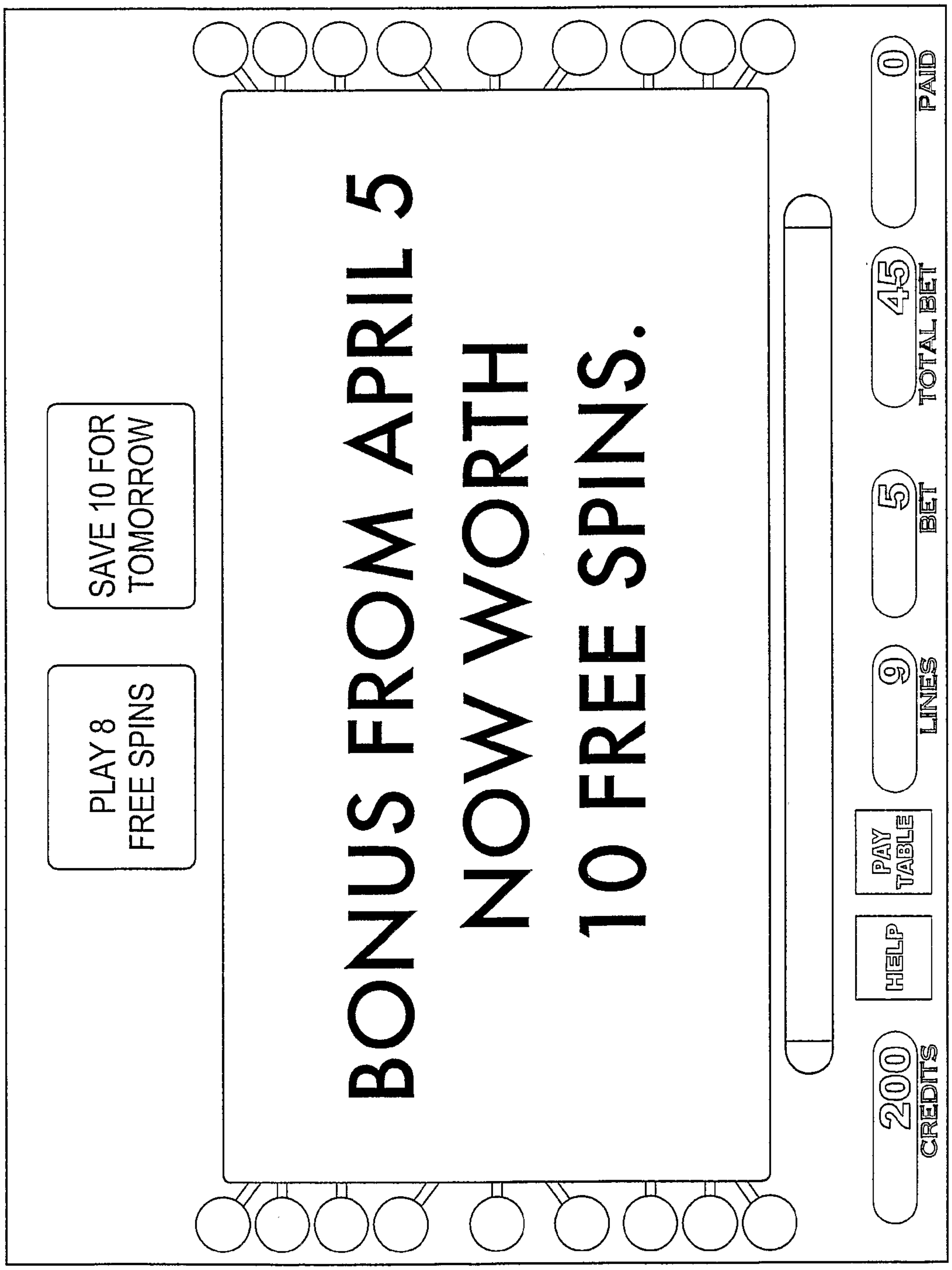
FIG. 5 illustrates a second winning game screen on the gaming terminal of FIG. 1.

FIG. 5 illustrates a screen that may be displayed on either the main display 26 or the secondary display 27 to a player who has chosen one of the second awards 56 and subsequently returns to the gaming terminal 10 and the appropriate time to collect. In this embodiment, once the player has been identified as having a win-deferral award (i.e., the unique identifier described above has been associated with a win-deferral award), either the main display 26 or secondary display 27 credits them with the second award 56 and provides an indication (e.g., by issuing a ticket or a card, or by associating the information with a particular ticket, card, RFID, or biometric information) that this is being done. In the embodiment shown in FIG. 5, the player is awarded 10 free spins. After each spin, a new screen may arise displaying how many spins are remaining. Alternatively, there may be a free-spin meter (not shown) on one of the displays 26, 27 that counts down the spins.

Figure 6:
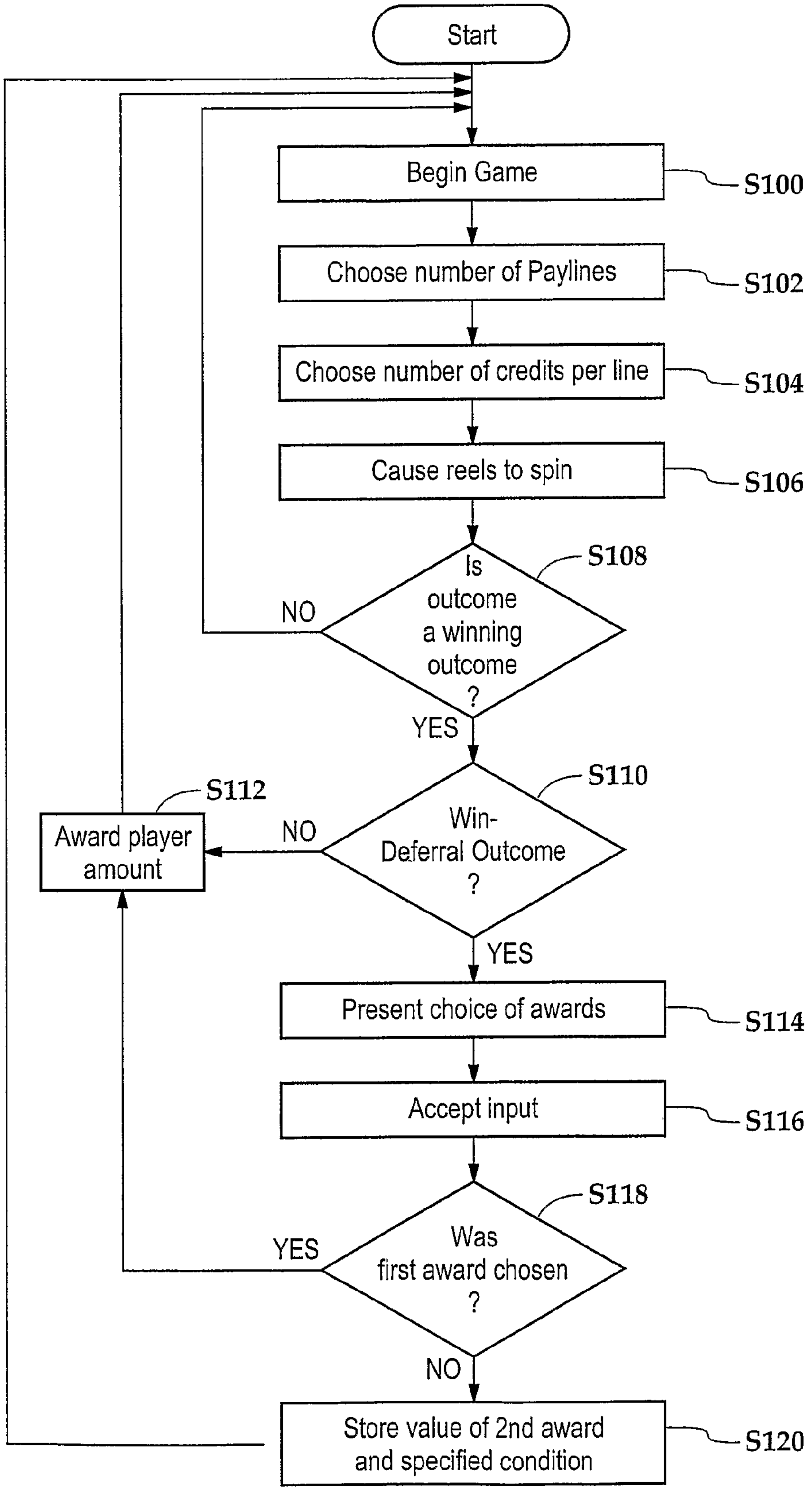
FIG. 6 is a flow chart describing the method of achieving a win-deferral award according to one embodiment of the present invention.

Turning now to FIG. 6, the operation detailing the method of playing the game according to the illustrated embodiment of the invention will be described. In step s100, a player at the gaming terminal 10 begins a gaming session by any conventional method (e.g., inserting coins or using credits). The gaming terminal 10 has a basic wagering game that involves a player making various inputs, including, for example, choosing a number of paylines to play (step s102). In some embodiments, there are a maximum of nine paylines, as shown in the gaming terminal 10 of FIG. 1. In other embodiments, there may only be a single payline. In those embodiments, this step would be skipped. After choosing how many paylines to play, the player selects how many credits (e.g., 1-5) to wager on each payline (step s104).

Regarding eligibility for the win-deferral award 52, in some embodiments, the player is only eligible for the win-deferral award 52 if the player chooses to play all of the paylines and/or the player wagers the maximum amount on each of the paylines played. In other embodiments, the player is automatically eligible for the win-deferral award 52, and is not required to make a minimum wager or to play a minimum number of lines. In some other embodiments, there is a "side-wager" option that allows the player to be eligible for the win-deferral award 52. The "side-wager" option is described in U.S. patent application Ser. No. 10/659,878, filed on Sep. 11, 2003, entitled "Gaming Machine With Multi-Level Progressive Jackpot," which is commonly owned and herein incorporated by reference in its entirety. These eligibility options may also be required for certain bonus and progressive games that may be included as part of the wagering game.

At step s106, the player begins the basic wagering game, thereby causing the reels to spin and display a symbol combination that corresponds to the randomly selected outcome from the CPU 30 (FIG. 2). At step s108, it is determined if the randomly selected outcome (i.e., arrangement of symbols) is one of the winning outcomes according to a basic-game pay table (not shown). If the answer is "no," the gaming terminal 10 returns to step s100, and the game begins again.

If the answer is "yes," then the gaming terminal 10 progresses to step s110, and then determines if the outcome is a win-deferral outcome. If the answer is "no," the player is awarded the amount associated with the outcome at step s112 and the gaming terminal 10 then returns to step s100.

If the answer to step s110 is "yes," then the gaming terminal 10 proceeds to step s114, and provides the player with a choice of accepting the first award 54 or the second award 56 (FIG. 4). As stated above, there may be any number of second awards 56 that are offered. The specified condition 58 is also listed along with the second awards 56 that are displayed. Next, at step s116, the gaming terminal 10 accepts the player's input as to which award is chosen. At step s118, the gaming terminal 10 determines whether the first award 54 was chosen. If the answer is "yes," then the gaming terminal 10 awards the player the amount of the first award 54 at step s112, and then returns to step s100.

If the answer is "no," the gaming terminal 10 stores in either its local memory 32, or causes to be stored in the system memory 52, the value or amount of the second award 56, and the specified condition 58 under which the second award 56 is to be given (step s120). The player may then be given a confirmation of the second award 56 and the specified condition 58 such as a ticket or card to remind the player of the second award 56 and the specified condition 58. After the confirmation, if there is one, is given, the second award 56 and specified condition 58 may be stored with a unique identifier as described above in reference to FIGS. 1 and 2. The gaming terminal then proceeds back to step s100 and begins a new game.

Figure 7:
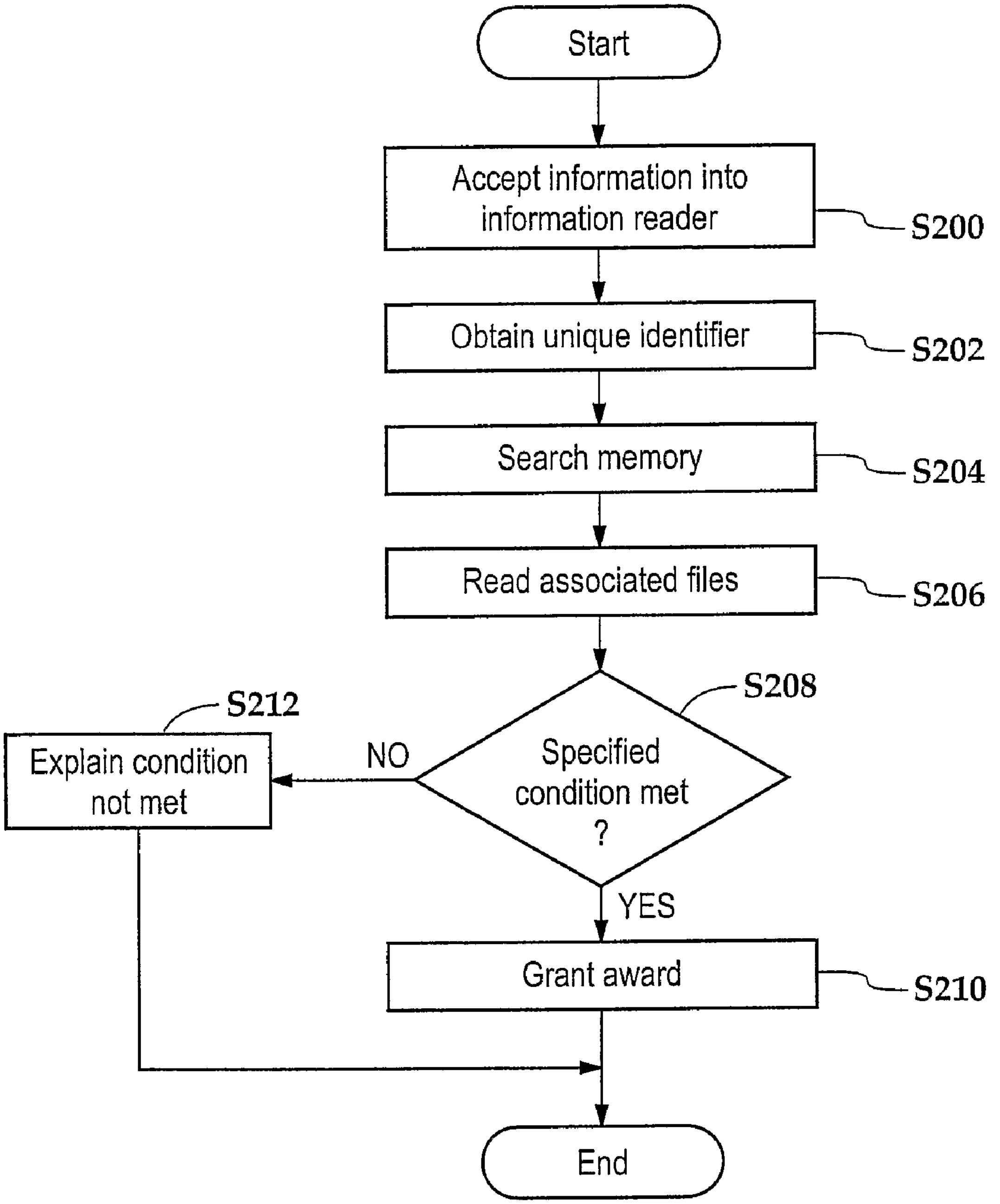
FIG. 7 is a flow chart describing the method of collecting a win-deferral award according to one embodiment of the present invention.

Turning now to FIG. 7, a method for retrieving the second award 56 is illustrated. The player inserts a confirmation ticket or player-identification card into the information reader 24 of the gaming terminal 10 at step s200. In some embodiments, the player may not have a card or confirmation ticket, and the gaming terminal 10 may receive the unique identifier through a biometric input, a RFID device, a keypad for receiving a player's PIN as described above in FIGS. 1 and 2.

The gaming terminal 10 reads the ticket, player-identification card, or other instrumentation provided by any standard method, such as a magneto-optical reader, bar code reader, imaging device, RFID, or biometric scanner and obtains the unique identifier discussed above at step s202. Once the information is obtained, the gaming terminal 10, at step s204, then searches the applicable memory 32, 52, for the unique identifier as described above. The unique identifier has associated with it any second awards 56 that have not been redeemed and the specified conditions 58 associated with each of the second awards 56. This information (the second awards 56 and the specified conditions) are then read by the CPU 30 (step s206) or a processor within the network 50. The CPU 30 (or a processor within the network 50), at step s208, then determines whether the specified conditions have been met. If the answer is "yes," the player is awarded the second award 56 at step s210 and the gaming terminal returns to an initial state (or step s100 as described in FIG. 6). If the answer is "no," the gaming terminal 10 informs the player that the condition has not been met at step s212. In some embodiments, the gaming terminal 10 may provide an explanation as to why the player did not receive the award or instructions on how the player can receive the award (if possible). For example, if the player is at the wrong gaming terminal, the gaming terminal 10 may provide instructions on how to get to the correct terminal. Or, if the player is too early to obtain the award, the gaming terminal 10 may inform the player as to when (or how much time is remaining until) the player can receive the award.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming terminal comprising:

a wagering game having a plurality of symbols that indicate a randomly selected outcome of the wagering game, the plurality of outcomes including at least one non-win-deferral outcome and a win-deferral outcome;

wherein if the outcome is the non-win-deferral outcome, immediately awarding an associated award to the player; and wherein, in response to the randomly selected outcome being a win-deferral outcome, the wagering game provides a player with a selection of immediately obtaining a first award while the player is still at the gaming terminal or foregoing the first award and obtaining a second award associated with the play of the wagering game, the second award obtained by the player only after returning to the gaming terminal in the future and under a specified condition.

2. The gaming terminal of claim 1, wherein the first award and the second award are monetary awards.

3. The gaming terminal of claim 1, wherein the first award and the second award are non-monetary awards.

4. The gaming terminal of claim 3, wherein the non-monetary awards are chosen from the group consisting of free spins, multipliers and an entry to an advanced game.

5. The gaming terminal of claim 4, wherein the entry to an advanced game is one of entry to a bonus game or entry to a progressive game.

6. The gaming terminal of claim 1, wherein one of the first award and the second award is a monetary award and the other of the first award and the second award is a non-monetary award.

7. The gaming terminal of claim 1, wherein the randomly selected outcome of the wagering game includes at least one winning outcome and at least one non-winning outcome.

8. A method of playing a wagering game via a gaming terminal, the method comprising:

using a processor to randomly select an outcome of the wagering game from a plurality of possible outcomes, the plurality of possible outcomes including at least one non-win-deferral outcome and a win-deferral outcome;

displaying the selected outcome on a display of the gaming terminal;

if the outcome is the non-win-deferral outcome, immediately awarding an associated award to the player;

if the outcome is the win-deferral outcome, displaying on the display a first award, a second award, and a specified condition that a player is required to meet to obtain the second award;

receiving an input from the player selecting one of the first award or the second award;

in response to the selection of the first award, immediately awarding the player the first award while the player is still at the gaming terminal; and in response to the selection of the second award, foregoing the first award and awarding the player the second award only after the player returns to the gaming terminal in the future and if the specified condition is met.

9. The method of claim 8, wherein determining the specified condition includes designating a time for the retrieval of the second award.

10. The method of claim 9, wherein designating a time includes a designating specific time frame for the retrieval of the second award, the time frame being chosen from one of a year, month, week, day, or span of hours.

11. The method of claim 8, wherein determining the specified condition includes determining a specific location for the retrieval of the second award.

12. The method of claim 11, wherein determining the specific location includes designating the player to go to a bank of gaming terminals or a particular type of gaming terminal for the retrieval of the second award.

13. A method of playing a wagering game comprising:

conducting the wagering game at a gaming terminal;

using a processor to randomly select an outcome of the wagering game from a plurality of possible outcomes, the plurality of possible outcomes including at least one non-win-deferral outcome and a win-deferral outcome;

displaying the selected outcome on a display of the gaming terminal;

if the outcome is the non-win-deferral outcome, immediately awarding an associated award to the player;

displaying a first player-selectable element and a second player-selectable element at the gaming terminal in response to achieving a predetermined outcome, the first player-selectable elements comprising a first associated award, and the second player-selectable element including a specified condition to be achieved prior to achieving a second associated award associated with the player of the wagering game;

selecting, via player inputs, one of the first and second player-selectable elements;

in response to the selection of the first player-selectable element, immediately awarding the player the first associated award while the player is still at the gaming terminal; and in response to the selection of the second player-selectable element, foregoing the first associated award and awarding the player the second associated award if the specified condition is achieved and only when the player returns to the gaming terminal in the future.

14. The method of claim 13, wherein the first and second player-selectable elements include monetary awards.

15. The method of claim 13, wherein the first and second player-selectable elements include non-monetary awards.

16. The method of claim 15, wherein the non-monetary awards are chosen from the group consisting of free spins, multipliers, and entries into an advanced game.

17. The method of claim 16, wherein the entry into an advanced game include one of an entry into a bonus game or an entry into a progressive game.

18. A gaming system comprising:

at least one display;

at least one gaming terminal for playing a wagering game, the wagering game having a plurality of possible outcomes including at least one non-win-deferral outcome and a win-deferred outcome; and a controller coupled to the at least one gaming terminal and the at least one display, the controller operative to (i) if the outcome is the non-win-deferral outcome, immediately awarding an associated award to the player;

(ii) in response to the win-deferred outcome being achieved, cause the display to display a first award option to immediately award the first award while the player is still at the gaming terminal and a second award option to a player, the second award option associated with the play of the wagering game;

(iii) presenting a specified condition to be met in conjunction with awarding a second award; and (iv) determining whether the specified condition has been met prior to awarding the second award in the future only after the player returns to the gaming terminal and foregoes the first award by selecting the second award option.

19. The gaming system of claim 18, wherein the controller is further operative to receive inputs from the player as to a selection of the first award option and the second award option.

20. The gaming system of claim 18, wherein the controller is further operative to determine the specified condition to be applied.

21. The gaming system of claim 20, wherein the controller is further operative to determine the specified condition utilizing a self-learning technique.

22. The gaming system of claim 20, wherein the controller is further operative to receive the specified condition to be presented from an outside source.

23. A gaming terminal comprising:

a wagering game having a plurality of symbols that indicate a randomly selected outcome of the wagering game the randomly selected outcome including at least one non-win-deferral outcome and a win-deferral outcome; and wherein, if the outcome is the non-win-deferral outcome, immediately awarding an associated award to the player; and wherein in response to the randomly selected outcome being a win-deferral outcome, the wagering game provides a player with a selection of immediately obtaining a first award while the player is still at the gaming terminal or foregoing the first award and obtaining a second deferred award associated with the play of the wagering game, the second award obtained by the player only after returning to the gaming terminal or another gaming terminal in the future and under a specified condition.

24. A method of playing a wagering game comprising:

conducting the wagering game at a gaming terminal the wagering game having a plurality of possible outcomes including at least one non-win-deferral outcome and a win-deferral outcome;

if the outcome is the non-win-deferral outcome, immediately awarding an associated award to the player;

achieving a win-deferral award at the gaming terminal;

displaying a first award and a second award at the gaming terminal, the second award associated with the play of the wagering game;

determining a specified condition that a player is required to meet to obtain the second award;

selecting, via player inputs, one of the first award or the second award;

in response to the selection of the first award, immediately awarding the player the first award while the player is still at the gaming terminal; and in response to the selection of the second award, foregoing the first award; and awarding the player the second award only after the player returns to the gaming terminal or another gaming terminal in the future and if a specified condition is met.

* * * * *